Patented May 6, 1930

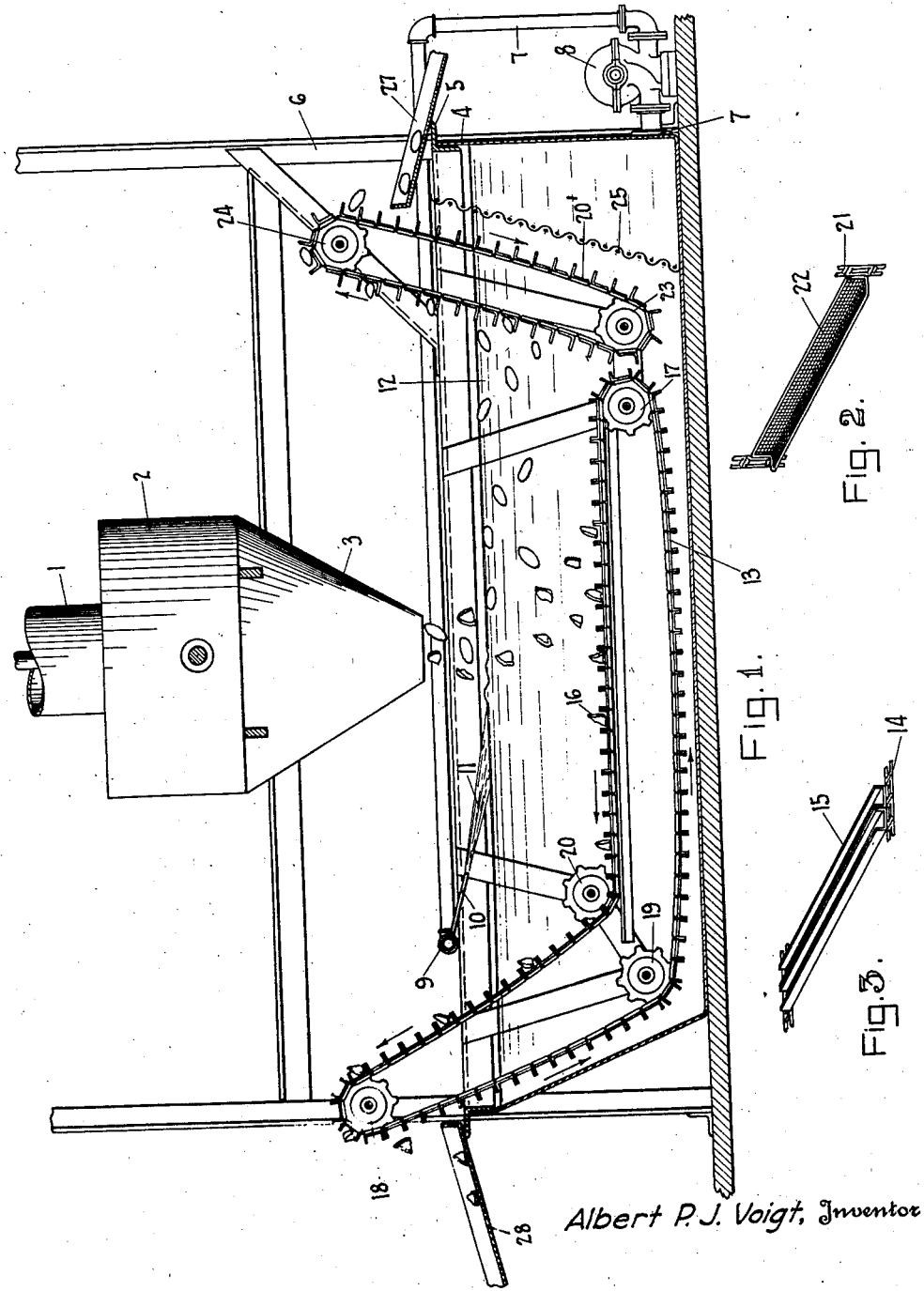

1,757,103

UNITED STATES PATENT OFFICE

ALBERT P. J. VOIGHT, OF GALVESTON, TEXAS

SEPARATOR

Application filed July 25, 1927. Serial No. 208,129.

My invention relates to a separator for separating the kernels from the shells of cracked nuts.

In cracking nuts mechanically and separating the kernels from the shells, it is ofttimes desirable to employ a floatation process to separate the kernels from the shells due to the difference in specific gravity between the kernels and the shucks. It is an object of my invention to employ a modification of the floatation process whereby a current of water artificially produced will serve to assist in separating the shucks from the kernels.

It is further desired to form a simplified apparatus for carrying water to separate the shells from the kernels and discharging them into a proper receptacle.

Referring to the drawing herewith, Fig. 1 is a central longitudinal section through a separator embodying my invention. Fig. 2 is a detail of the conveyer flights employed in carrying away the kernels of the nuts; and Fig. 3 is a detail of the conveyer flights employed in carrying away the shucks of the nuts.

It is contemplated that the nuts will be fed through a chute 1 to a cracker 2. This cracker may be any desirable type of commercial cracker and the details of the same are not shown, as being an immaterial part of this invention. The nuts are cracked and fed through a downwardly tapering chute 3 to a tank 4. Said tank is of sufficient depth to accommodate my conveyers for carrying off the kernels and the shells of the nuts. Around the upper edge of the tank is a frame 5 rectangular in shape and preferably made of angle iron and connected with a frame work, indicated at 6, upon which the operating mechanism is mounted.

There is an outlet from the tank at 7, leading to a rotary pump 8, which acts to drive the water from the tank through a pipe 7 extending across the upper side of the tank and terminating in a pipe 9 transversely of the tank at one end, said pipe 9 having a series of nozzles 10 directed downwardly and inwardly so as to project a stream of water 11 along the surface of the water level, indicated at 12 in the tank.

In the lower end of the tank, below the discharge chute 3, is a conveyer 13. Said conveyer is made up of two side sprocket chains 14 connected by flights 15 which may be of channel iron, as indicated in Fig. 3, there being thus provided a regular series of outwardly projecting blades or flights, which are adapted to engage the shells indicated at 16, to convey them from the tank. The conveyer thus formed is carried by sprockets 17 adjacent the bottom of the tank and by upper sprocket wheels at the end of the tank and above the level of the water. The belt runs about two pairs of idle sprockets 19 and 20 arranged adjacent the bottom of the tank and acting to guide the belt in its passage between the two sprockets 17 and 18, as will be understood from the drawing.

The kernels from the nuts are adapted to be carried from the tank by a conveyer 20'. Said conveyer is made up of sprocket chains 21 at each side and said sprocket chains are connected by flights 22, the construction of which is best shown in Fig. 2. It is of angular formation and is made up of foraminous material, allowing the free passage of liquid therethrough. This conveyer thus provided operates over lower sprocket wheels 23 and upper sprocket wheels 24 above the tank.

The conveyers and the main portion of the tank are separated from the pump inlet by a partition 25 of woven wire or other foraminated material which prevents the shells or other foreign matter from passing to the pump.

In the operation of the device the shells and kernels are discharged into the water below the discharge chute 3, the kernels being lighter than the shucks will tend to float adjacent the water surface and the shucks being heavier will tend to sink downwardly upon the conveyer 13. The action of the pump will be to cause a current of water directed toward the conveyer 20 for the kernels, and these will be carried along adjacent the surface of the water into contact with the conveyer by means of which they will be carried upwardly and discharged into an outlet chute 27 leading to any container for the kernels. The shucks which are heavier will be affected somewhat by the current of water from the jets 11 but will sink to the conveyer 13 and will be carried upwardly and discharged into an outlet chute 28 leading to some container for the shells.

The advantages of this construction lie in its simplicity and in the fact that no complicated apparatus is necessary for the separation of the shells from the kernels. The jet of water which carries the kernels laterally against the conveyer 20 is efficient in separating the kernels from the shells in such manner that when the kernels are discharged from the separator they will be entirely free of any shells or other foreign matter. The further advantages of the device will be obvious to those skilled in the art.

What I claim as new is:

A floatation separator comprising in combination a tank, a plurality of endless conveyor belts disposed therein and adapted to discharge at opposite ends of said tank, one of said belts being positioned along the bottom and one side of said tank, a liquid in said tank, means above said tank and arranged to discharge material to be separated into said liquid, means to circulate the liquid including an intake at the bottom of said tank and discharge nozzles adjacent the top and adapted to cause circulation longitudinally of the tank, another of said belts arranged to receive the kernels carried by said liquid and elevate them therefrom, and a screen protecting said circulating means.

In testimony whereof I hereunto affix my signature this 15th day of July, A. D. 1927.

ALBERT P. J. VOIGT.